United States Patent
Kim

(10) Patent No.: US 6,948,423 B2
(45) Date of Patent: Sep. 27, 2005

(54) APPARATUS FOR PRODUCING CONFECTIONERY

(75) Inventor: Hyung-Seob Kim, Seoul (KR)

(73) Assignee: Delice Co., Ltd. (KR)

( * ) Notice: Subject to any disclaimer, the term of this patent is extended or adjusted under 35 U.S.C. 154(b) by 0 days.

(21) Appl. No.: 10/991,739

(22) Filed: Nov. 18, 2004

(65) Prior Publication Data

US 2005/0103208 A1 May 19, 2005

(30) Foreign Application Priority Data

Nov. 19, 2003 (KR) ................................ 10-2003-0082383

(51) Int. Cl.$^7$ ............................. A23L 1/00; A21C 9/04; A21C 9/06; A21C 11/00; A23P 1/00
(52) U.S. Cl. ......................... 99/353; 99/386; 99/443 C; 99/450.1; 99/450.7; 99/450.8
(58) Field of Search .......................... 99/353–355, 339, 99/340, 352, 386, 443 R, 443 C, 444–450, 477–479, 450.1–450.8, 483; 425/112, 363, 391, 133.1, 131.1, 307, 308; 118/13, 16, 24, 314, 324; 426/138, 283, 284, 496, 502, 503, 512, 517, 514, 518

(56) References Cited

U.S. PATENT DOCUMENTS

| | | | | | |
|---|---|---|---|---|---|
| 3,605,641 | A | * | 9/1971 | Shuster | 99/450.7 |
| 4,084,494 | A | * | 4/1978 | Ezaki | 99/450.7 |
| 4,515,817 | A | * | 5/1985 | Pavan | 426/106 |
| 4,597,976 | A | * | 7/1986 | Doster et al. | 426/325 |
| 4,604,947 | A | * | 8/1986 | Pavan | 99/353 |
| 4,928,592 | A | * | 5/1990 | Moshier et al. | 99/450.8 |
| 5,520,100 | A | * | 5/1996 | Wadell | 99/450.1 |
| 5,697,290 | A | * | 12/1997 | Watanabe et al. | 99/450.2 |
| 6,032,610 | A | * | 3/2000 | Fitch et al. | 118/13 |
| 6,083,545 | A | * | 7/2000 | Nelson et al. | 426/293 |
| 6,116,152 | A | | 9/2000 | Kim | 99/353 |
| 6,302,013 | B1 | * | 10/2001 | Batagllia | 99/450.2 |
| 6,355,288 | B1 | * | 3/2002 | DiGiacomo | 426/282 |
| 6,802,248 | B1 | * | 10/2004 | Chiang | 99/450.7 |

* cited by examiner

Primary Examiner—Timothy F. Simone
(74) Attorney, Agent, or Firm—Cantor Colburn LLP

(57) ABSTRACT

Disclosed is an apparatus for producing confectionery. In the apparatus for producing confectionery, a material injection unit for supplying materials into a confectionary mold includes a hopper, an injector, a hose, and a piston actuator, which are detachably connected to a main frame. With this configuration, the foregoing elements are detached and cleaned, thereby keeping the elements sanitary.

6 Claims, 10 Drawing Sheets

1

APPARATUS FOR PRODUCING CONFECTIONERY

CROSS-REFERENCE TO RELATED APPLICATION

This application claims the benefit of Korea Patent Application No. 2003-82383 filed on Nov. 19, 2003, the disclosure of which is hereby incorporated herein by reference in its entirety.

BACKGROUND OF THE INVENTION

1. Field of the Invention

The present invention relates to an apparatus for producing confectionery.

2. Description of the Related Art

Confectionery is not limited to a hard preparation, but includes a soft preparation such as bread, a rice cake or the like. Such confectionery tastes delicious shortly after being baked.

Generally, the confectionery in circulation is massively produced by a confectionary factory that does hardly provide access to consumers. The produced confectionary is packaged and then transported over relatively long distance from the confectionary factory to the consumer, so that it takes relatively too much time to supply the consumer with the confectionery, thereby deteriorating the taste of the confectionery.

One example of an apparatus for producing the confectionery has been disclosed in U.S. Pat. No. 6,116,152, titled "apparatus for producing confectioneries," in which the apparatus has a small size and can be installed in an incommodious space.

In the case of the apparatus disclosed in U.S. Pat. No. 6,116,152, a distribution channel can be shortened, so that it is possible to supply fresh confectionery to the consumer. As a result, the apparatus can not only satisfy the consumer's taste, but also enhance reliability of the confectionery. In addition, the apparatus can stimulate consumer's interest.

However, the conventional apparatus disclosed in U.S. Pat. No. 6,116,152 has the following problems:

First, a hopper for storing materials is partitioned into two portions, and dough and cream are stored therein respectively, so that it is difficult to clean the inside of the hopper. Further, the hopper is coupled to an upper surface of an injector by a bolt, so that there is additionally needed a tool for releasing the bolt in order to separate the hopper from the injector.

Second, a hose, which is connected with the injector and used to fill a confectionary mold with the materials, is connected to an intermediate shaft together with a rolling wheel. Here, the hose is made of a metal body which is integrated with the intermediate shaft, so that it is difficult to clean the hose. Further, to clean the hose, the hose should be separated from a main frame. To separate the hose from the main frame, the intermediate shaft should be also separated from the main frame. At this time, because the hose, the intermediate shaft and the rolling wheel are formed as a single body, it is difficult to handle them.

As described above, in the conventional apparatus disclosed in U.S. Pat. No. 6,116,152, it is inconvenient to clean the hopper and the hose used as a material injection unit.

SUMMARY OF THE INVENTION

Accordingly, It is an object of the present invention to provide an apparatus for producing confectionery, in which a hopper, an injector and a hose formed as a material injection unit are easily disassembled, so that the hopper, the injector and the hose can be easily cleaned, be kept sanitary, and produce the confectionery of various tastes by easy replacement of the hopper.

Another object of the present invention is to provide an apparatus for producing confectionery, capable of supplying consumers with fresh confectionery together with cleanness.

To achieve the above purposes, an aspect of the present invention provides an apparatus for producing confectionery comprising: a main frame; a material injection unit provided in the main frame and including a hopper, an injector, a hose, and a piston actuator; and an elevation unit provided in the material injection unit and including a slider, a rolling wheel, and an intermediate shaft to which the hose are coupled, wherein the injector is divided into a first injector and a second injector and detachably coupled to an installation plate extending from the main frame, the hopper is divided into a first hopper and a second hopper corresponding to the first and second injectors, the hose has an inlet and an outlet detachably connected to each injector and the intermediate shaft, whereby the material injection unit is detachably provided in the main frame.

Preferably, the first and second injectors are each provided with a hopper coupling hole on an upper surface thereof, the hopper coupling hole being provided with a hermetical ring fitted into an inner periphery thereof.

Preferably, the first and second injectors are each clamped by an installation handle so as to be detachably coupled to the installation plate.

Preferably, the hose includes the inlet fitted with a hose assembly formed with a cut portion, and each of the first and second injectors includes, a hose assembly connecting hole into which the hose assembly is inserted and a hose assembly holding plate to which the hose assembly is locked, on its one side, so that the inlet of the hose is detachably connected to the injector.

Preferably, the first and second injectors includes first and second switches respectively, the first and second switches being connected by a pivot connector so as to be interlocked with each other.

Preferably, the hose includes the outlet connected with a nozzle, and the intermediate shaft is provided with a holding plate formed with a nozzle holding hole into which the nozzle is fitted, so that the nozzle connected to the outlet of the hose is detachably coupled to the holding plate.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
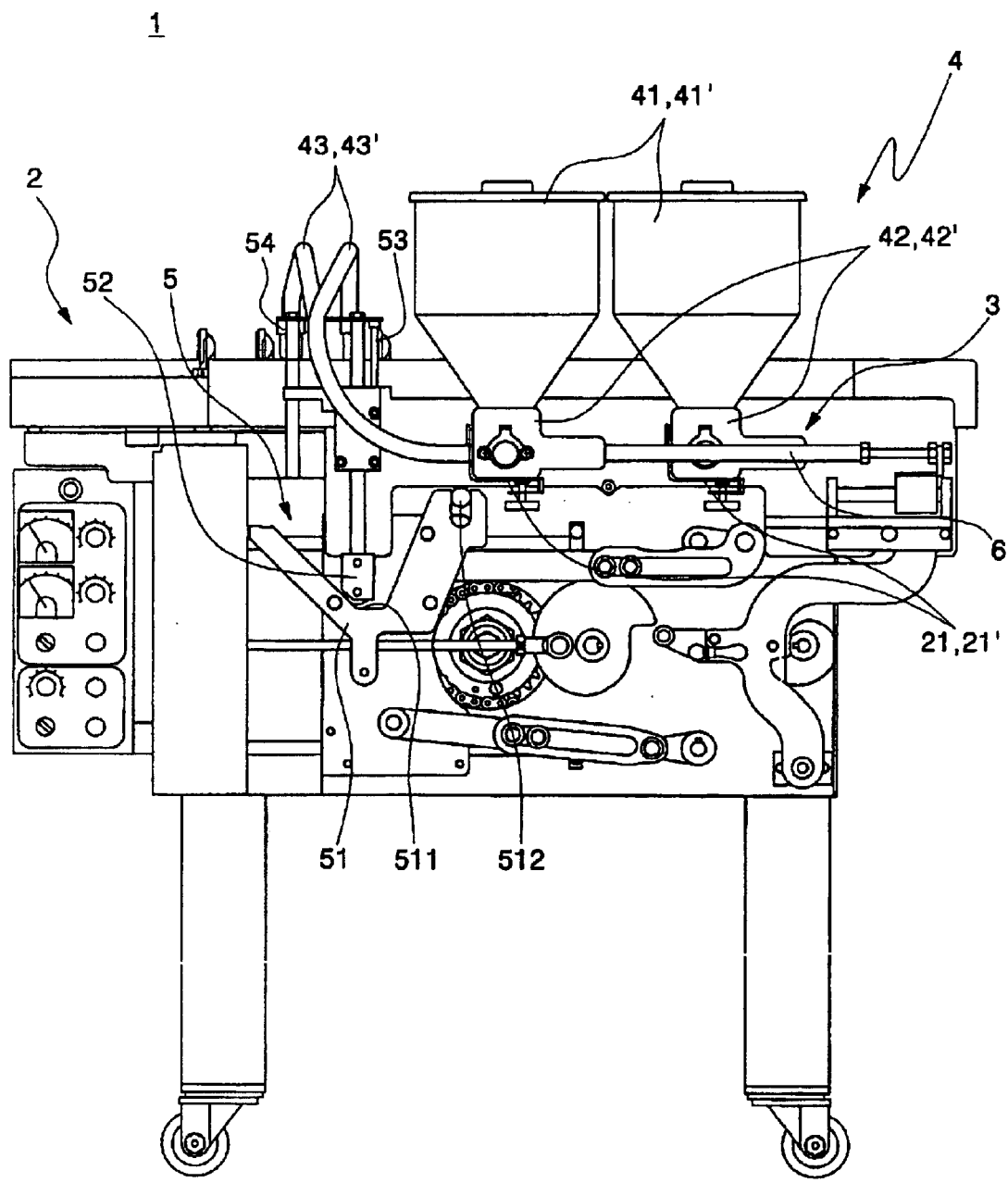
FIG. 1 is a view for illustrating a material injection unit and an elevation unit in an apparatus for producing confectionery according to an embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Figure 2A:
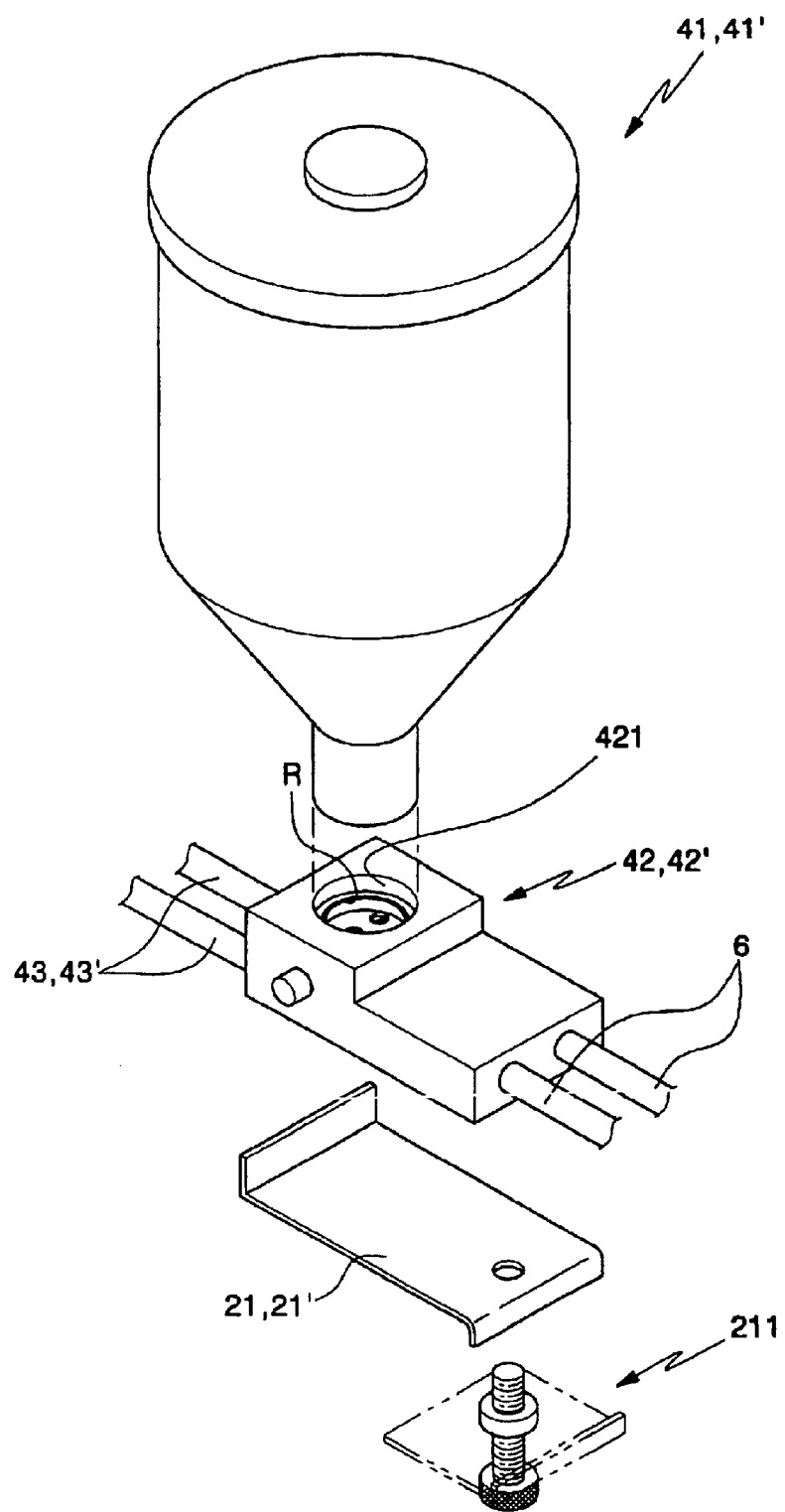
FIG. 2a is an exploded perspective view of a hopper and an injector in the material injection unit of the apparatus according to an embodiment of the present invention.
Figure 2B:
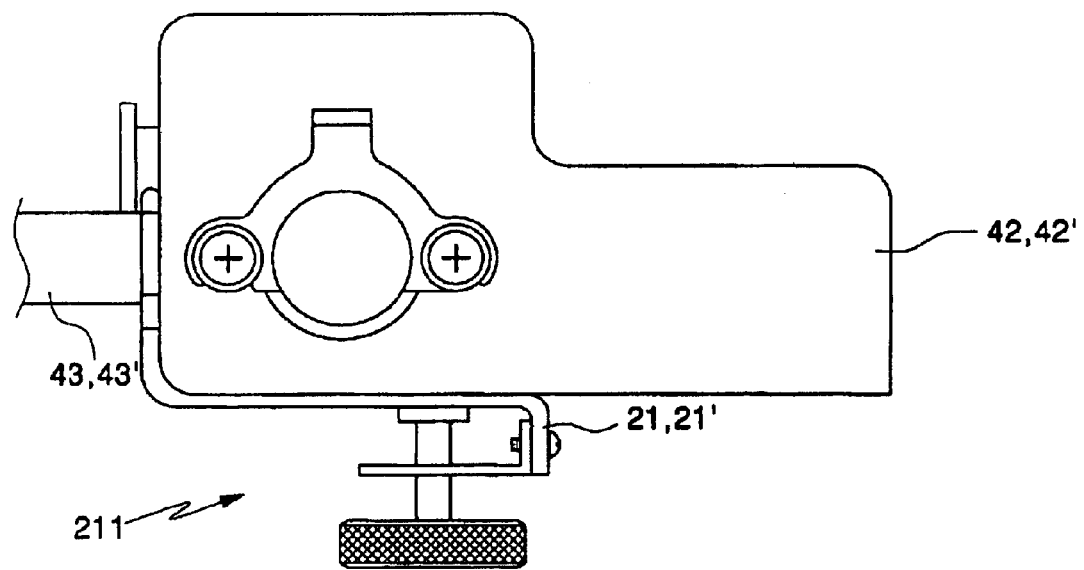
FIG. 2b is a view for illustrating the injector attached to an installation plate in the material injection unit of the apparatus according to an embodiment of the present invention.
Figure 3A:
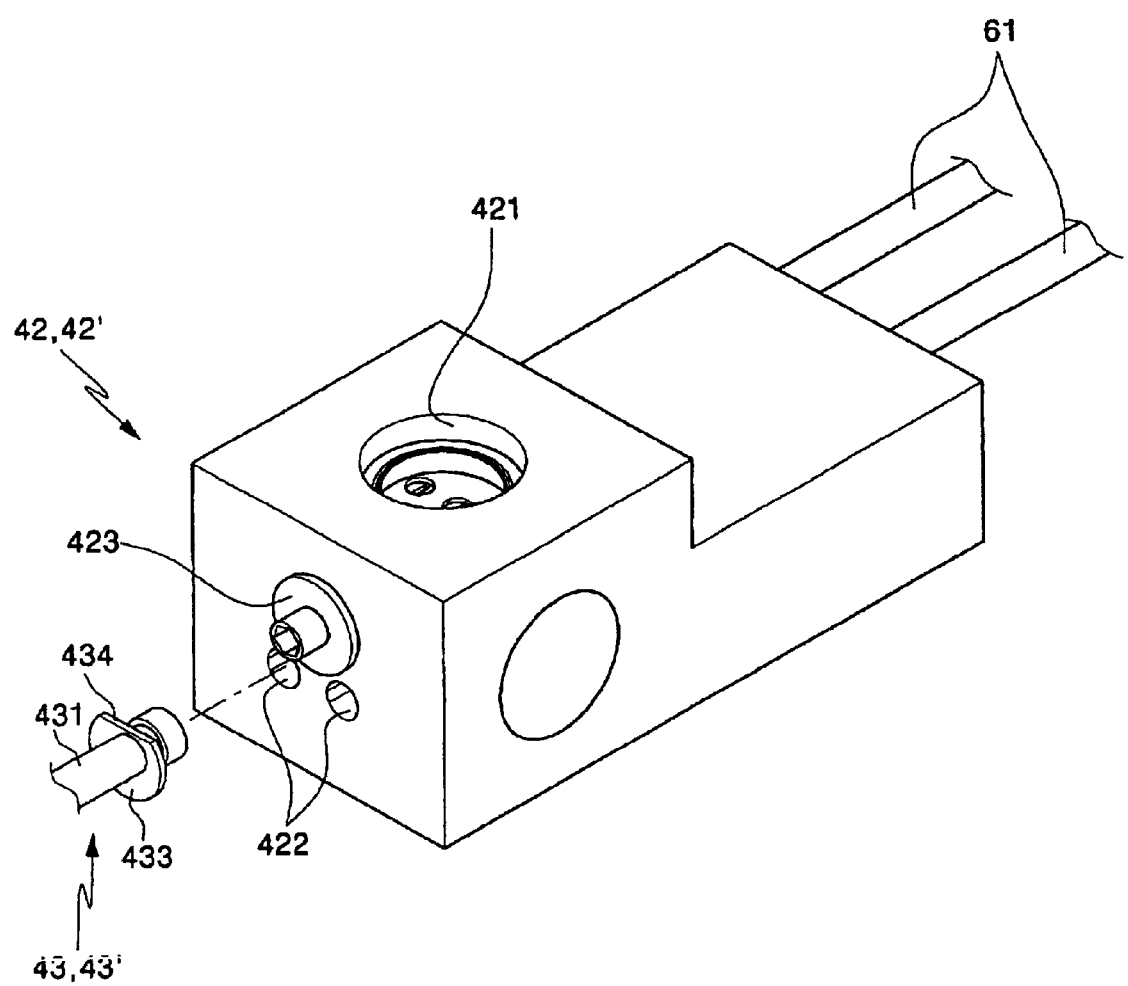
FIG. 3a is an exploded perspective view of the injector and a hose in the material injection unit of the apparatus according to an embodiment of the present invention.
Figure 3B:
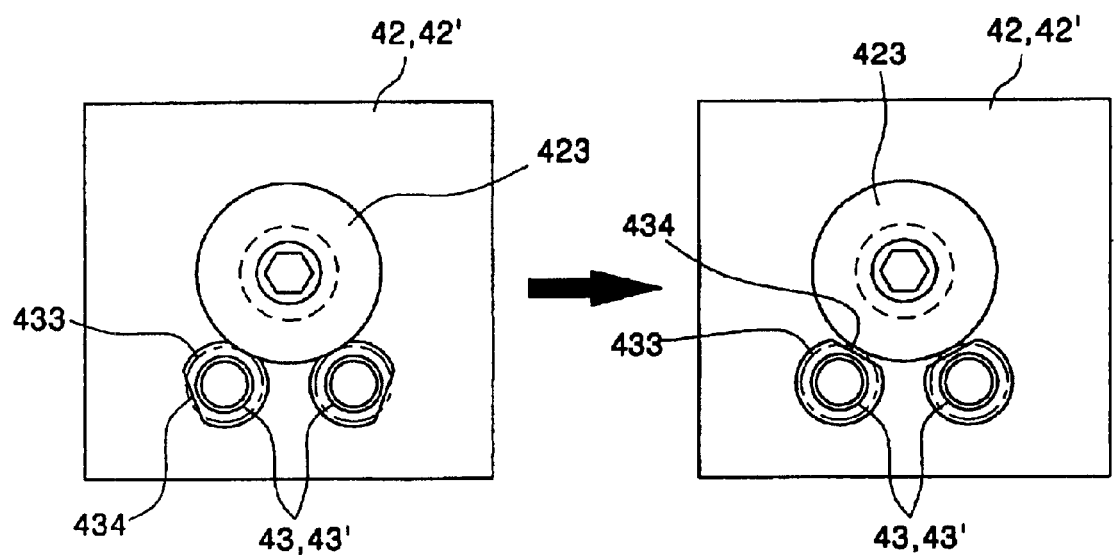
FIG. 3b is a cross-sectional view for illustrating an assembled state of the injector and the hose in the material injection unit of the apparatus according to an embodiment of the present invention.
Figure 4:
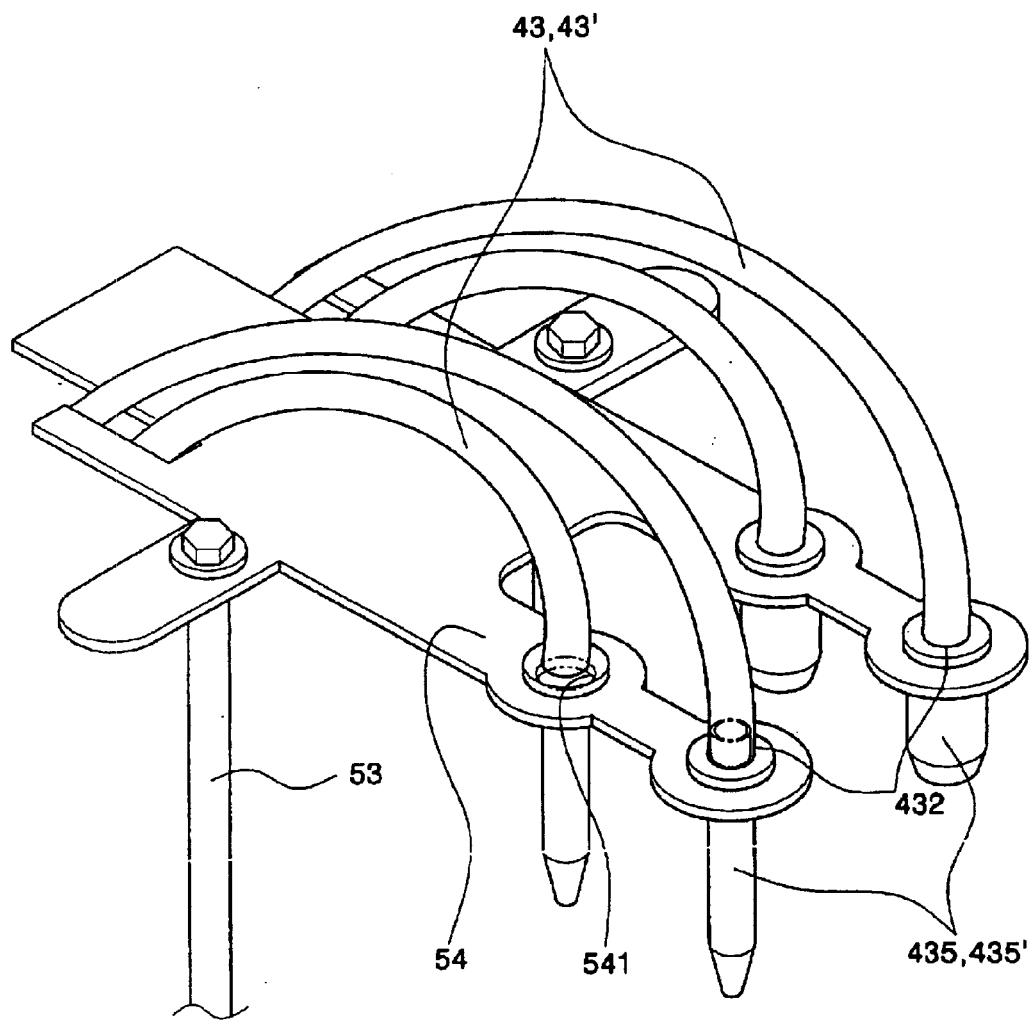
FIG. 4 is a perspective view for illustrating an outlet of the hose attached in an intermediate shaft of the elevation unit in the apparatus according to an embodiment of the present invention.
Figure 5A:
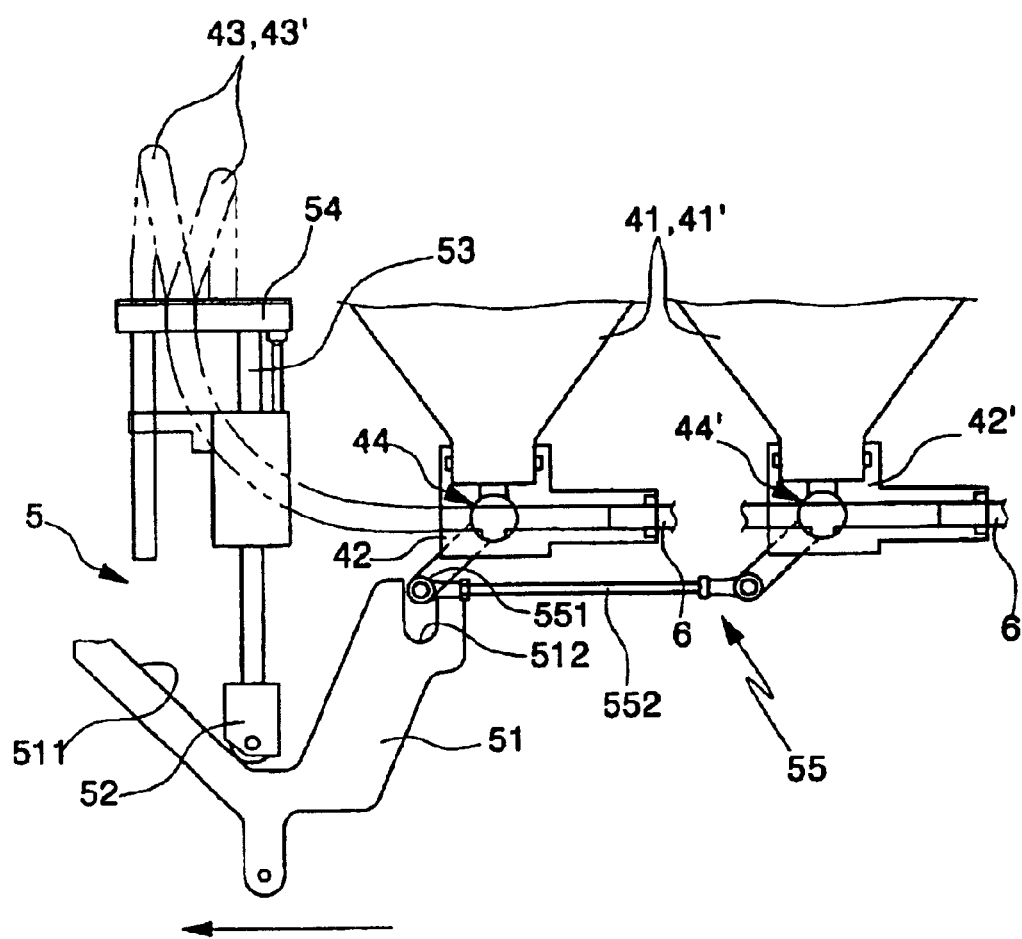
FIGS. 5a and 5b are views for illustrating operations of the material injection unit in the apparatus according to an embodiment of the present invention.
Figure 5B:
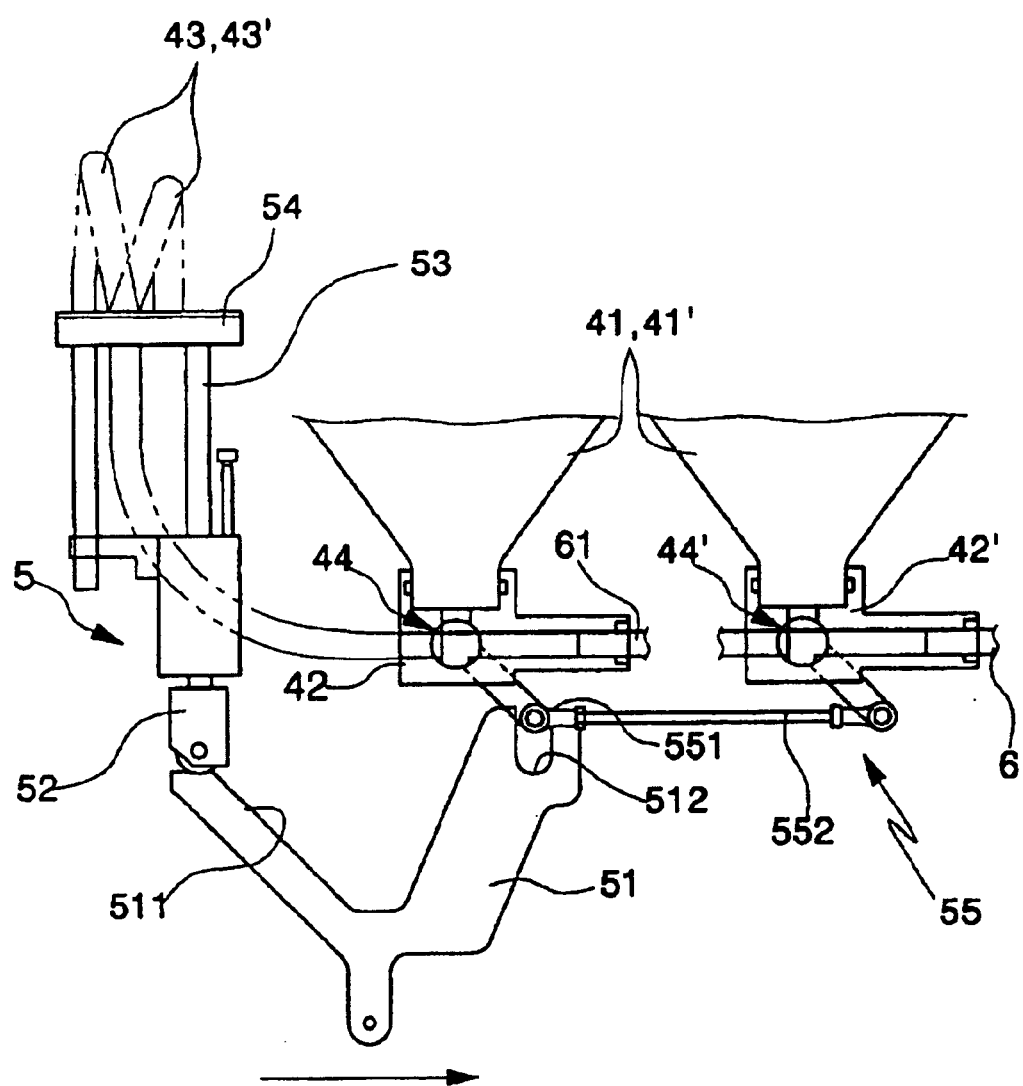

FIG. 1 is a view for illustrating a material injection unit and an elevation unit in an apparatus for producing confectionery according to an embodiment of the present invention; FIG. 2a is an exploded perspective view of a hopper and an injector in the material injection unit of the apparatus according to an embodiment of the present invention; FIG. 2b is a view for illustrating the injector attached to an installation plate in the material injection unit of the apparatus according to an embodiment of the present invention; FIG. 3a is an exploded perspective view of the injector and a hose in the material injection unit of the apparatus according to an embodiment of the present invention; FIG. 3b is a sectional view for illustrating an assembled state of the injector and the hose in the material injection unit of the apparatus according to an embodiment of the present invention; FIG. 4 is a perspective view for illustrating an outlet of the hose attached in an intermediate shaft of the elevation unit in the apparatus according to an embodiment of the present invention; and FIGS. 5a and 5b are views for illustrating operations of the material injection unit in the apparatus according to an embodiment of the present invention.

Referring to FIG. 1, a material injection unit 4 is comprised of a hopper divided into a first hopper 41 and a second hopper 41', an injector divided into a first injector 42 and a second injector 42', and hoses 43 and 43' having inlet and outlet detachably coupled to injectors 42, 42' and an intermediate shaft 53.

FIG. 2a is an exploded perspective view of a hopper and an injector in the material injection unit of the apparatus according to an embodiment of the present invention.

Referring to FIG. 2a, each of the first and second injectors 42 and 42' has an upper surface formed with a hopper coupling hole 421. Each hopper coupling hole 421 are inserted and fixed by each of the hoppers 41 and 41'. Each hopper coupling hole 421 is provided with a hermetical ring R on its inner periphery to firmly install the hoppers 41 and 41'. The first and second hoppers 41 and 41' are coupled to the first and second injectors 42 and 42', and contain an outer material and an inner or stuffing material, respectively.

FIG. 2b is a view for illustrating the injector attached to an installation plate in the material injection unit of the apparatus according to an embodiment of the present invention.

Referring to FIG. 2b, the first and second injectors 42 and 42' are installed in a pair of first and second installation plates 21 and 21', respectively. Here, each of the injectors 42 and 42' is formed with a bolt hole on a bottom thereof, and each of the installation plates 21 and 21' is formed with a through hole corresponding to the bolt hole, so that each of the injectors 42 and 42' is installed to each of the installation plates 21 and 21' by inserting an installation handle 211 into the bolt hole through the through hole. Preferably, the installation handle 211 comprises a handle allowing a user to conveniently lock and release it. Thus, each of the injectors 42 and 42' can be easily separated from each of the installation plate 21 and 21' by releasing the installation handle 211.

FIG. 3a is an exploded perspective view of the injector and a hose in the material injection unit of the apparatus according to an embodiment of the present invention; and FIG. 3b is a cross-sectional view for illustrating an assembled state of the injector and the hose in the material injection unit of the apparatus according to an embodiment of the present invention.

Referring to FIG. 3a, the first and second injectors 42 and 42' are formed with a pair of hose assembly connecting holes 422 communicating with the hopper coupling hole 421. Around the hose assembly connecting holes 422, there is provided a hose assembly holding plate 423, which is partially interfered with the hose assembly connecting holes 422.

Referring to FIG. 3b, each of the hoses 43 and 43' has an inlet 431 into which a hose assembly 433 is fitted. The hose assembly 433 has an annular shape and is inserted into and fixed to each inner diameter portion of the hoses 43 and 43'. Further, the hose assembly 433 is formed with a cut portion 434, so that the hose assembly 433 coupled with the inlet 431 can be inserted into the hose assembly connecting holes 422 without interfering with the hose assembly holding plate 423, and then rotated to be held by the holes assembly holding plate 423, thereby connecting the hoses 43 and 43' with the hose assembly connecting holes 422. Oppositely, the hoses 43 and 43' can be separated from the hose assembly connecting holes 422 in the reverse of the foregoing order.

FIG. 4 is a perspective view for illustrating an outlet of the hose attached in an intermediate shaft of the elevation unit in the apparatus according to an embodiment of the present invention.

Referring to FIG. 4, an outlet 432 of each of the hoses 43 and 43' is fitted to each of nozzles 435 and 435'. In a connection portion between the outlet 432 and the nozzle 435, 435', there is separately provided a clamp (not shown) to enhance clamping force. Further, the nozzles 435 and 435' are provided on a holding plate 54 coupled to the intermediate shaft 53 of an elevation unit, wherein the holding plate 54 is formed with a nozzle holding hole 541. Among the nozzles 435 and 435', the nozzle 435 is for injecting the inner or stuffing material, while the nozzle 435' is for injecting the outer material. Thus, the nozzles 435 and 435' fitted to the outlets 432 of the hoses 43 and 43' are detachably provided on the holding plate 54.

Referring to FIG. 1, as a slider 51 of the elevation unit 5 moves in left and right directions, the rolling wheel 52 connected to the intermediate shaft 53 moves up and down along an inclined surface 511 of the slider 51, so that the holding plate 54 to which the outlets 432 of the hoses 43 and 43' are fixed correspondingly moves up and down, thereby supplying two kinds of materials through the nozzles 435 and 435' moved down adjacent to the confectionary mold.

FIGS. 5a and 5b are views for illustrating operations of the material injection unit in the apparatus according to an embodiment of the present invention.

Referring to FIGS. 5a and 5b, inside the first and second injectors 42 and 42', i.e., between the hopper coupling hole 421 and the hose assembly connecting hole 422, there are provided first and second switches 44 and 44'. Each of the switches 44 and 44' generally employs a three-way valve, and is connected by a pivot connector 55 to be interlocked with each other. At this time, the pivot connector 55 comprises a movable joint 551 which is accommodated in an operation groove 512 formed in the slider 51 and moves up and down, and a pivot shaft 552 having a first end hinged to the movable joint 551 and the first switch 44 and a second end hinged to the second switch 44'. Thus, when the slider 51 travels in the left and right directions, the movable joint 551 of the pivot connector 55 moves up and down in the operation groove 512, and the pivot shaft 552 travels in the left and right directions, thereby interlocking the switches 44 and 44' with each other. As described above, the switches 44 and 44' are rotated clockwise and counterclockwise, so that material feed channels are switched inside the injectors 42 and 42'.

With this configuration according to the present invention, in the apparatus for producing confectionery, the material injection unit and the elevation unit are operates as follows.

Referring to FIGS. 5a and 5b, the material injection unit 4 and the elevation unit 5 are driven to operate by a driving unit (not shown) provided in the main frame 2. When the slider 51 of the elevation unit 5 moves left, the rolling wheel 52 connected to the intermediate wheel 53 moves down along the inclined surface 511 of the slider 51, and correspondingly the holding plate 54 also moves down. At the same time, the nozzle coupled to the holding plate 54 moves toward a material injecting position, and each of the switches 44 and 44' is operated by the pivot connector 55 to form the channels for injecting the materials. By contrast, when the slider 51 moves right, the holding plate 54 is returned to an original position, and the switch 44, 44' is operated by the pivot connector 55 to form the channels for receiving the materials from the hopper 41, 41' as shown in FIG. 5b.

Figure 6:
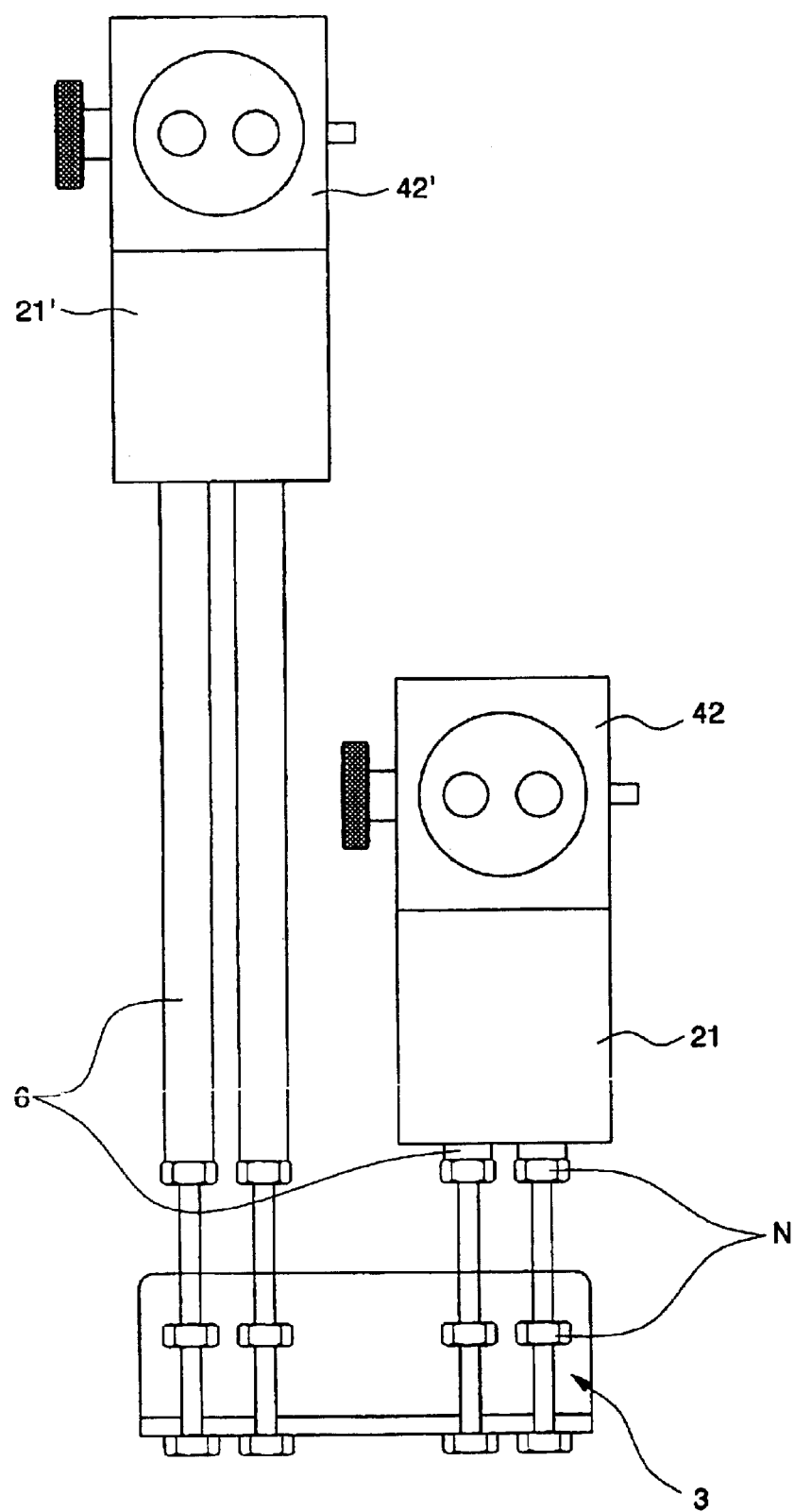
FIG. 6 is a plan view of operations of end blocks in the apparatus according to an embodiment of the present invention.

Here, an end block allows the materials stored in the hoppers 41 and 41' to be supplied to the injectors 42 and 42' and injected through the hose 43, 43'. FIG. 6 is a plan view of operations of end blocks in the apparatus according to an embodiment of the present invention.

As shown in FIG. 6, the end block 3 is connected with a piston actuator 6 provided in the first and second injectors 42 and 42'. Thus, when the end block 3 travels left and right, the piston actuator 6 correspondingly allows the injectors 42 and 42' to receive the materials from the hopper and to supply the received materials to the hose, thereby injecting the materials to the confectionary mold. Here, the piston actuator 6 is coupled to the end block 3 by a nut N, so that the piston actuator 6 can be easily detached from the end block 3 by releasing the nut N.

Figure 7:
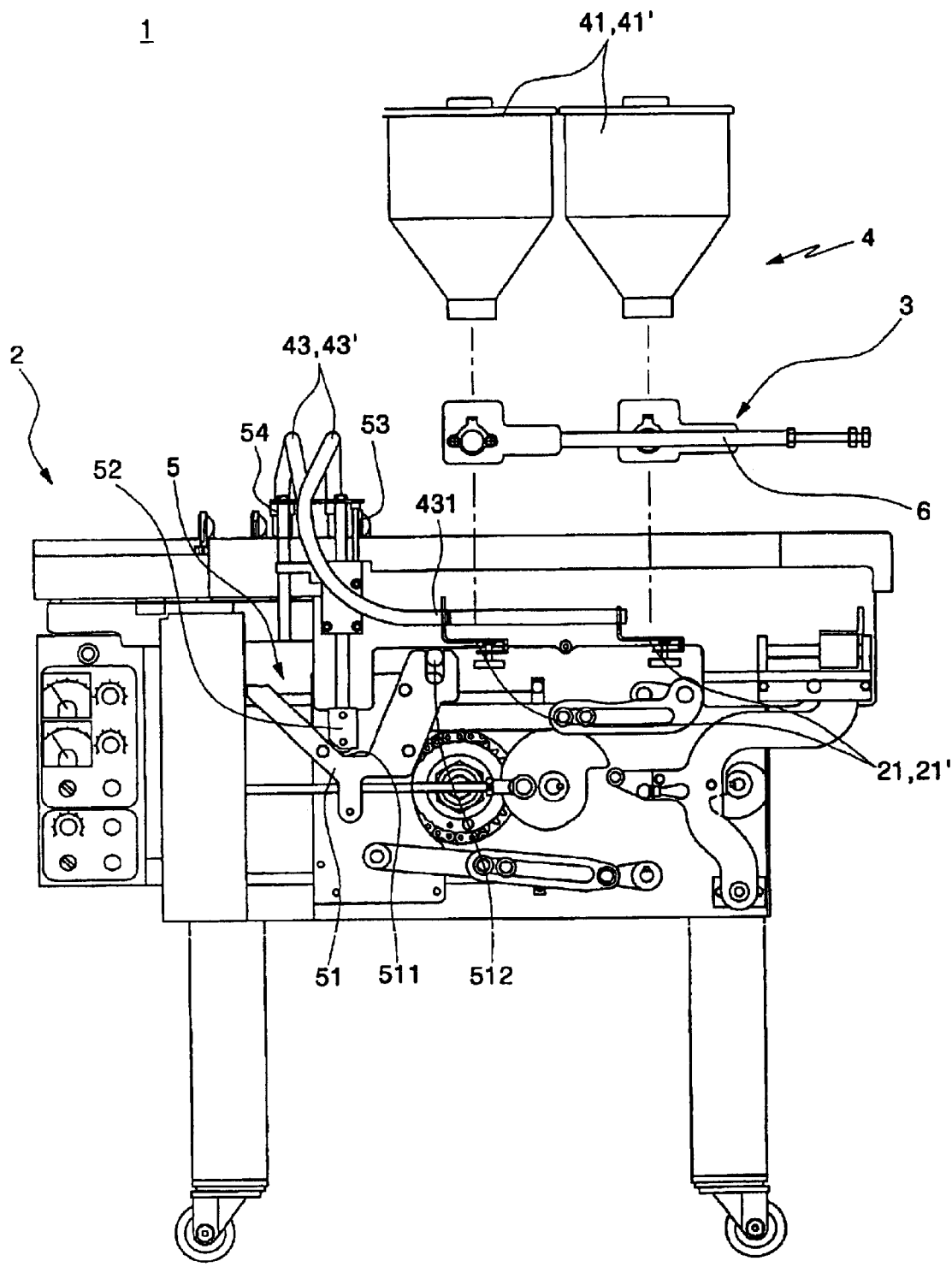
FIG. 7 is a view for illustrating a detached state of the material injection unit from the apparatus according to an embodiment of the present invention.

FIG. 7 is a view for illustrating a detached state of the material injection unit from the apparatus according to an embodiment of the present invention.

The hoppers 41 and 41' are inserted in the hopper coupling holes 421 of the first and second injectors 42 and 42' respectively, so that the hoppers 41 are 41' are easily detached from the hopper coupling holes 421 by a predetermined force without a separate tool. Further, the injectors 42 and 42' can be easily detached from the installation plates 21 and 21' by releasing the installation handles 211. Also, each of the hoses 43 and 43' has the inlet 431 and the outlet 432 fitted to the hose assembly connecting hole and the holding plate 54, so that the hoses 43 and 43' can be easily detached therefrom without a separate tool. Additionally, the piston actuator 6 provided in each of the injectors 42 and 42' can be easily detached from the end block 3 by releasing the nut N.

Thus, in the present apparatus 1 for producing the confectionery, the elements forming the material injection unit 4 are easily detached from the main frame 2 without a separate tool, so that it is convenient to clean the hoppers 41 and 41', the injectors 42 and 42' and the hoses 43 and 43' and to then couple them to the main frame 2 without a separate tool.

As described above, the present invention provides an apparatus for producing confectionery, in which components of a material injection unit, such as a hopper, an injector and a hose, are detachably formed, so that the hopper, the injector and the hose can be easily cleaned and be kept sanitary.

Further, the present invention provides an apparatus for producing confectionery, which can supply a consumer with fresh confectionery together with cleanness.

While the present invention has been described with reference to a particular embodiment, it is understood that the disclosure has been made for purpose of illustrating the invention by way of examples and is not limited to limit the scope of the invention. And one skilled in the art can make amend and change the present invention without departing from the scope and spirit of the invention.

What is claimed is:

1. An apparatus for producing confectionery, comprising:
   a main frame;
   a material injection unit provided in the main frame and including a hopper, an injector, a hose, and a piston actuator; and
   an elevation unit provided in the material injection unit and including a slider, a rolling wheel, and an intermediate shaft to which the hose are coupled,
   wherein the injector is divided into a first injector and a second injector and detachably coupled to an installation plate extending from the main frame, the hopper is divided into a first hopper and a second hopper corresponding to the first and second injectors, the hose has an inlet and an outlet detachably connected to each injector and the intermediate shaft,
   whereby the material injection unit is detachably provided in the main frame.

2. The apparatus as claimed in claim 1, wherein the first and second injectors are each provided with a hopper coupling hole on an upper surface thereof, the hopper coupling hole being provided with a hermetical ring fitted into an inner periphery thereof.

3. The apparatus as claimed in claim 1, wherein the first and second injectors are each clamped by an installation handle so as to be detachably coupled to the installation plate.

4. The apparatus as claimed in claim 1, wherein the hose includes the inlet fitted with a hose assembly formed with a cut portion, and wherein each of the first and second injectors includes, a hose assembly connecting hole into which the hose assembly is inserted and a hose assembly holding plate to which the hose assembly is locked, on its one side, so that the inlet of the hose is detachably connected to the injector.

5. The apparatus as claimed in claim 1, wherein the first and second injectors includes first and second switches respectively, the first and second switches being connected by a pivot connector so as to be interlocked with each other.

6. The apparatus as claimed in claim 1, wherein the hose includes the outlet connected with a nozzle, and wherein the intermediate shaft is provided with a holding plate formed with a nozzle holding hole into which the nozzle is fitted, so that the nozzle connected to the outlet of the hose is detachably coupled to the holding plate.

* * * * *